United States Patent
Zidulka et al.

(10) Patent No.: US 8,632,109 B2
(45) Date of Patent: Jan. 21, 2014

(54) WASTE RETRIEVAL AND DISPOSAL DEVICE AND METHOD

(76) Inventors: Arnold Zidulka, Montreal (CA);
Bernard Shalinsky, Montreal (CA)

( * ) Notice: Subject to any disclaimer, the term of this patent is extended or adjusted under 35 U.S.C. 154(b) by 0 days.

(21) Appl. No.: 13/183,181

(22) Filed: Jul. 14, 2011

(65) Prior Publication Data

US 2011/0272955 A1 Nov. 10, 2011

Related U.S. Application Data

(60) Division of application No. 12/285,397, filed on Oct. 3, 2008, now Pat. No. 8,038,190, which is a continuation of application No. PCT/CA2007/000554, filed on Apr. 4, 2007.

(60) Provisional application No. 60/788,704, filed on Apr. 4, 2006.

(51) Int. Cl.
*A01K 29/00* (2006.01)
*B65D 30/10* (2006.01)
*B65D 33/00* (2006.01)

(52) U.S. Cl.
USPC .............................. 294/1.5; 294/1.4

(58) Field of Classification Search
USPC ........... 294/1.3, 1.4, 1.5, 55; 15/257.1, 257.3, 15/257.4, 257.9; 248/95, 99, 100, 101; 383/105
See application file for complete search history.

(56) References Cited

U.S. PATENT DOCUMENTS

| | | | |
|---|---|---|---|
| 3,767,246 A * | 10/1973 | Corelli et al. | 294/1.5 |
| 4,121,866 A * | 10/1978 | Schall et al. | 294/1.4 |
| 4,243,259 A | 1/1981 | Wright | |
| 4,383,710 A | 5/1983 | Fehr | |
| D290,416 S * | 6/1987 | Breuer | D30/162 |
| 4,852,924 A * | 8/1989 | Ines | 294/1.5 |
| 4,875,729 A | 10/1989 | Peck | |
| 4,962,956 A | 10/1990 | Scripter | |
| 5,290,080 A | 3/1994 | Yoshioka | |
| 5,370,431 A | 12/1994 | Henninger et al. | |
| 5,400,572 A | 3/1995 | Peck et al. | |
| 5,403,050 A | 4/1995 | Searing et al. | |
| 5,564,762 A | 10/1996 | Ring | |
| 5,601,321 A | 2/1997 | Simon | |

(Continued)

FOREIGN PATENT DOCUMENTS

JP 11243803 A 9/1999
JP 2001320999 11/2001

(Continued)

*Primary Examiner* — Paul T Chin
(74) *Attorney, Agent, or Firm* — Norton Rose Fulbright Canada

(57) ABSTRACT

A method for disposing of waste material, where the head of a frame is inserted in a bag until a closed front edge of the bag receives a leading edge of the head and the head is at least substantially contained within the bag, with the head fitting loosely within the bag along its side edges. The rear edge of the top panel of the bag is connected to the frame. After the waste material is received on the top panel, and while maintaining the connection between the rear edge of the top panel and the frame, the bag is inverted by moving the rear edge of the bottom panel frontwardly of the head and of the front edge of the bag before moving the rear edge of the bottom panel rearwardly over the top panel, the head and the waste material.

15 Claims, 7 Drawing Sheets

(56) References Cited

U.S. PATENT DOCUMENTS

| | | | |
|---|---|---|---|
| 5,620,220 A | 4/1997 | Khoshnood | |
| 5,725,268 A | 3/1998 | Besasie et al. | |
| 5,971,452 A | 10/1999 | Marymor et al. | |
| 6,086,123 A | 7/2000 | Sowinski et al. | |
| 6,237,972 B1 | 5/2001 | Jung | |
| 6,394,514 B1* | 5/2002 | Kidd | 294/1.4 |
| 6,485,073 B2* | 11/2002 | Harrison | 294/1.4 |
| 6,648,387 B2* | 11/2003 | Kaplan | 294/1.5 |
| 7,188,878 B1* | 3/2007 | Kraus | 294/1.4 |
| 7,618,073 B2* | 11/2009 | Casper | 294/1.4 |
| 2006/0279097 A1* | 12/2006 | Jones et al. | 294/1.3 |

FOREIGN PATENT DOCUMENTS

| | | |
|---|---|---|
| JP | 2002142596 A | 5/2002 |
| JP | 3089618 U | 10/2002 |
| JP | 2004242520 A | 2/2004 |
| JP | 204222697 A | 8/2004 |
| JP | 3105847 U | 9/2004 |
| JP | 2005006617 A | 1/2005 |

\* cited by examiner

WASTE RETRIEVAL AND DISPOSAL DEVICE AND METHOD

CROSS-REFERENCE TO RELATED APPLICATION

This application is a divisional of application Ser. No. 12/285,397, filed on Oct. 3, 2008, which is a continuation of International Patent Application No. PCT/CA2007/000554 filed on Apr. 4, 2007 and designating the United States, which itself claims priority from U.S. Provisional Application No. 60/788,704 filed on Apr. 4, 2006.

FIELD OF THE INVENTION

The present invention relates to waste disposal, particularly to a waste retrieval and disposal device including a frame and a bag.

BACKGROUND ART

In some countries, pet owners are obligated by law to remove waste material produced by their pet on a public property. Even where no law to that effect exists, pet owners are usually expected to remove such waste material, as waste material left on the streets, sidewalks, etc. is generally unappealing and unhygienic.

A number of scooper devices, i.e. devices used to pick up waste material on the ground, have pincer-like arms which are inserted in a bag and used to pick up the waste. The bag is then inverted, placing the soiled surface and the waste material inside the bag. However, pincer-like scoopers are generally not adapted to be used as catchers, i.e. to catch waste before the waste contacts the ground. Scooped waste material generally leaves a waste residue on the ground, which can be a health hazard, especially for children.

A variety of devices allow for support of a bag in an open position, the bag being maintained under the animal before the waste is produced, thus catching the waste in the bag which is then removed from the device and thrown away. The problem with such devices is that the bag can become soiled, either by the falling waste itself if the open end of the bag is not adequately aligned under the animal, or by the ground where the bottom of the bag makes contact. Thus, the user can be required to manipulate a dirty bag, which is not desirable.

Accordingly, improvements are desirable.

SUMMARY OF INVENTION

It is therefore an aim of the present invention to provide an improved waste retrieval and disposal device.

It is also an aim of the present invention to provide an improved method for disposing of waste material.

Therefore, in accordance with the present invention, there is provided a waste retrieval device comprising a frame having a head portion and a member extending rearwardly from the head portion, one of the head portion and the member including a top retaining element extending therefrom, and a bag for containing at least partially the head portion, the bag including a top panel sized to extend over the head portion and a bottom panel sized to extend under the head portion, the top and bottom panels being interconnected along front and side edges thereof and defining a rear open end therebetween, a rear edge of the top panel being attachable to the frame by the top retaining element, the top and bottom panels defining side portions extending from the interconnected side edges proximate the open end, the side portions of the bag providing extra bag material extending beyond the head portion when the bag at least partially contains the head portion to allow the bag to be inverted by moving a rear edge of the bottom panel under the head portion away from the member and back toward the member over the head portion and top panel with the rear edge of the top panel remaining attached to the frame.

Also in accordance with the present invention, there is provided an invertible bag for containing part of a frame, the part of the frame defining a surface area, the bag comprising a top panel having a first front edge, a first rear edge, and first side edges extending between the first front and rear edges, the top panel defining a top portion corresponding to the surface area and first side portions extending between the first side edges and the top portion, a bottom panel having a second front edge, a second rear edge, and second side edges extending between the second front and rear edges, each of the second side edges being connected to a corresponding one of the first side edges, and the bottom panel defining a bottom portion corresponding to the surface area and second side portions extending between the second side edges and the bottom portion, the first and second side portions providing extra bag material allowing the second rear edge to be brought under the bottom panel and around the first and second front edges without substantially affecting a configuration of the bottom portion.

Further in accordance with the present invention, there is provided a method for disposing of waste material comprising partially inserting a frame within a bag though a rear open end thereof, the bag having partially interconnected top and bottom panels respectively extending over and under the frame and defining the rear open end, retaining a rear edge of the top panel to the frame, receiving waste material on the top panel over the frame, moving a rear edge of the bottom panel frontwardly of a front edge of the frame to at least partially invert the bottom panel, and moving the rear edge of the bottom panel rearwardly over the top panel and the waste material to invert the bag while containing the waste material therewithin.

BRIEF DESCRIPTION OF THE DRAWINGS

Reference will now be made to the accompanying drawings, showing by way of illustration a particular embodiment of the present invention and in which.

DETAILED DESCRIPTION OF PARTICULAR EMBODIMENTS

Figure 3:
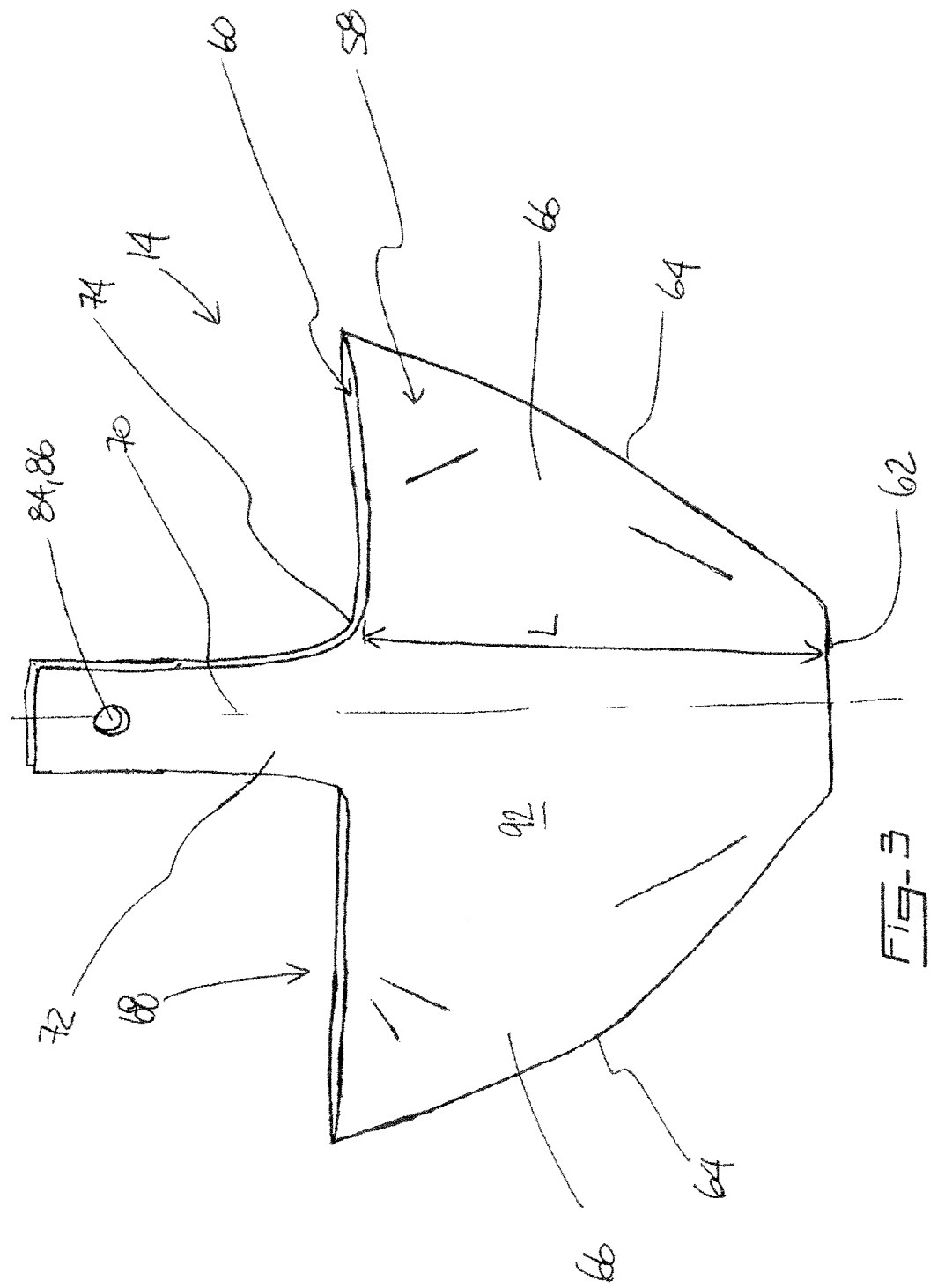
FIG. 3 is a front elevation view of a bag of a waste retrieval and disposal device according to a particular embodiment of the present invention.

A waste retrieval and disposal device 10 according to a particular embodiment of the present invention generally comprises a frame 12 (see FIG. 1) and a bag 14 (see FIG. 3). The device 10 can be used both to catch waste material before it touches the ground and to scoop waste material already on the ground.

Figure 1:
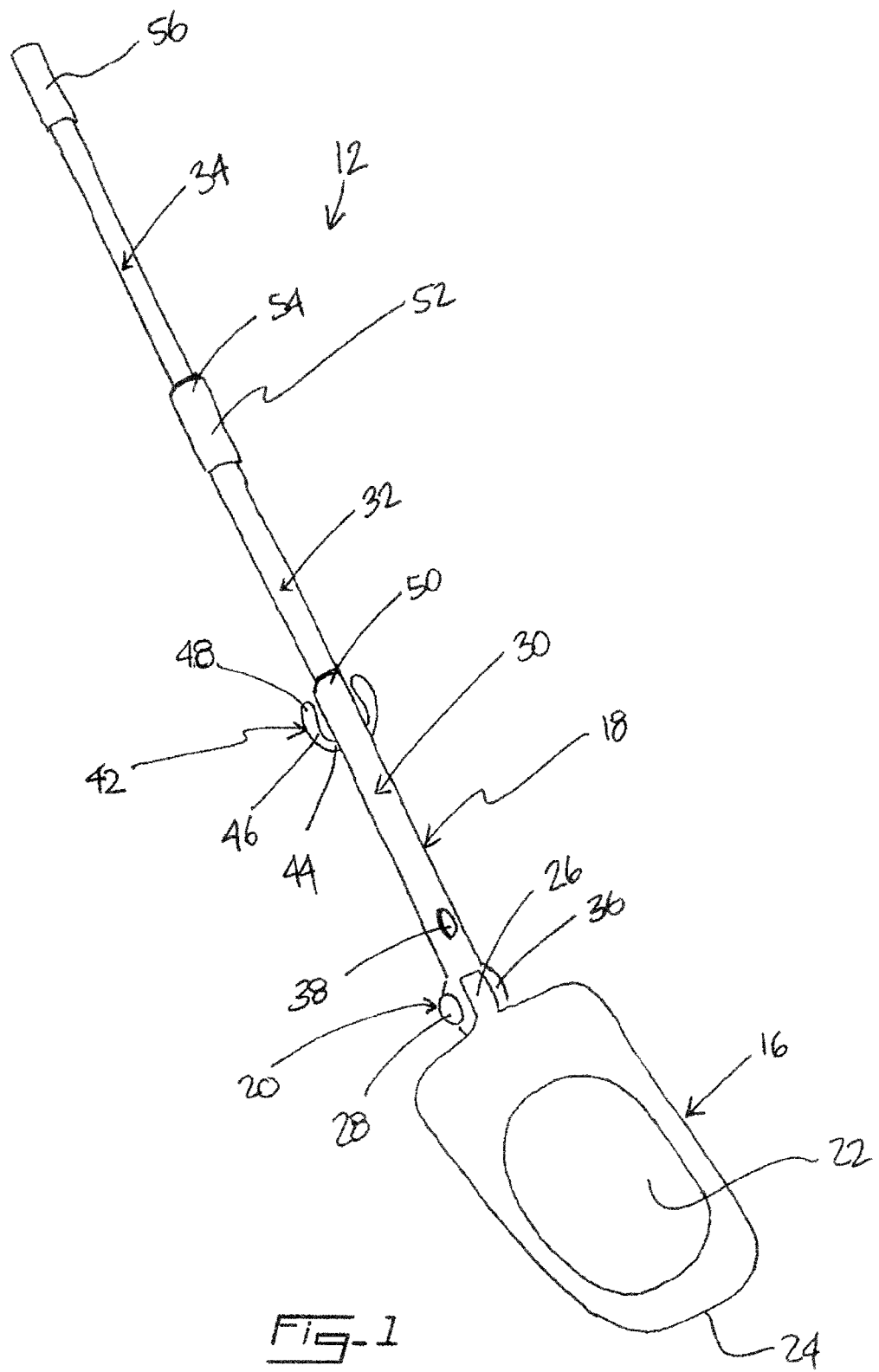
FIG. 1 is a perspective view of a frame of a waste retrieval and disposal device according to a particular embodiment of the present invention.
Figure 2:
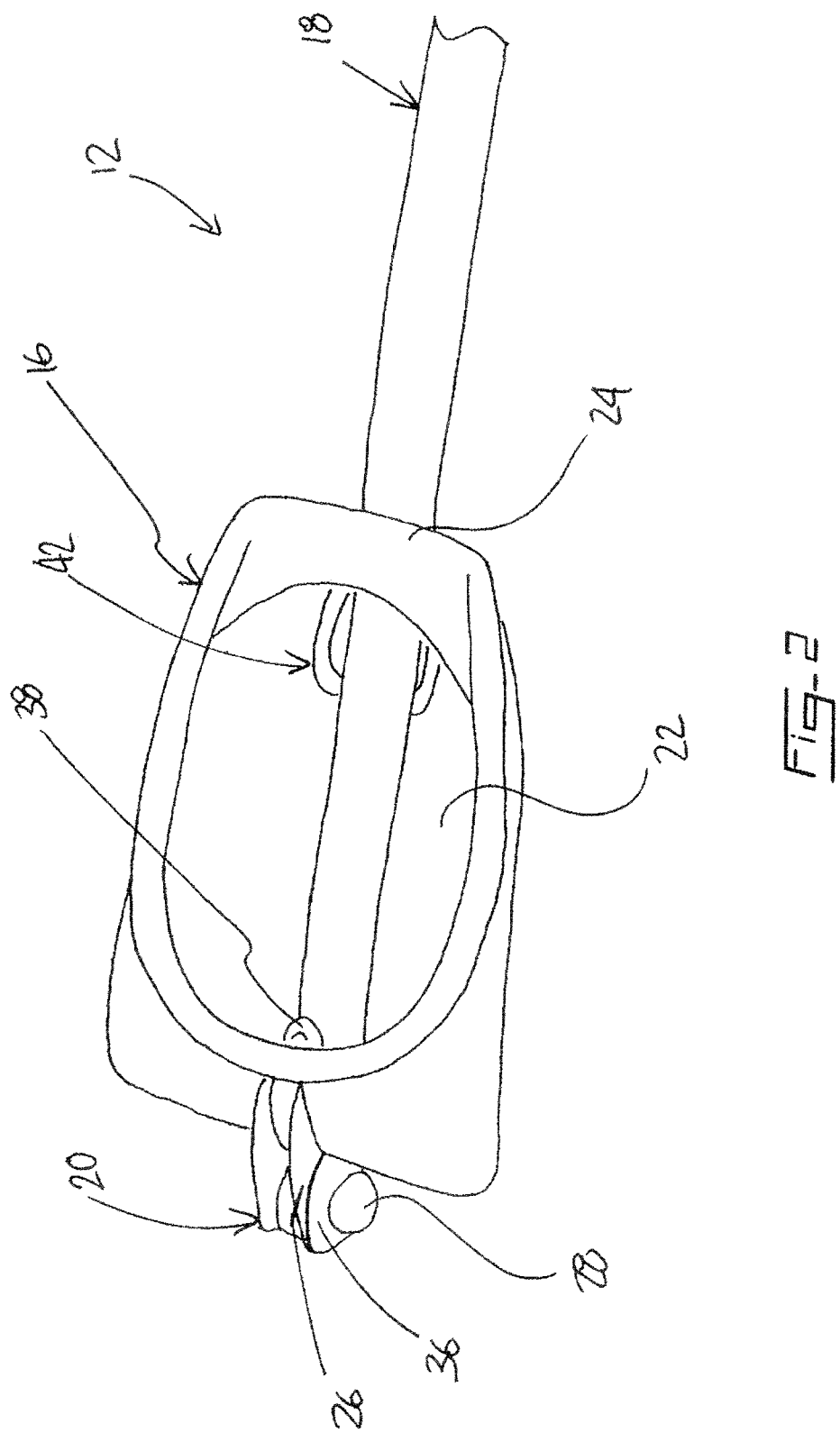
FIG. 2 is a perspective view of the frame of FIG. 1 in a folded storage position.

Referring to FIGS. 1 and 2, the frame 12 generally includes a shovel-like head 16 which is connected to a handle shaft 18 through a pivot connection 20. The head 16 is thus pivotable between an extended use position (see FIG. 1) and a retracted storage position (see FIG. 2). Alternately, the head 16 can be connected to the shaft 18 through any kind of appropriate connection, including for example a rigid connection.

The head 16 has a somewhat planar shape and has a substantially large opening 22 defined therein, which can be for example oval in shape. Alternately, the head 16 can have a concave shape or any other shape appropriate to receive a waste element therein, and in this case the opening 22 can be omitted. The head 16 defines a leading edge 24 at a front end thereof, which is substantially shaped like a leading edge of a shovel to facilitate use of the device 10 to scoop waste on the ground. The head 16 also includes a finger 26 protruding from the back end thereof. The finger 26 has a bore defined therethrough (not shown) for receiving a pin 28 of the pivot connection 20.

Referring to FIG. 1, the shaft 18 includes first, second and third sections 30, 32, 34 which are slidably connected to one another to allow for a relative telescopic motion therebetween. The first shaft section 30 is in the form of a hollow rod and includes, at one extremity thereof, two arms 36 which are spaced such as to receive the finger 26 of the head 16 therebetween. Each arm 36 includes a bore defined therethrough (not shown) which is aligned with the bore of the finger 26 to receive the pin 28 such as to form the pivot connection 20. A locking mechanism (not shown) can optionally be provided to retain the head 16 in the use position, with biasing means (not shown) bringing the head 16 in the retracted position when the locking mechanism is released. Alternately, the head 16 can be locked in the retracted position and biased in the use position.

In proximity of the pivot connection 20, the first section 30 also includes diametrically opposed top and bottom retaining elements extending therefrom, which in the particular embodiment shown include pins 38, 40 (see also FIGS. 4 to 7). The pins 38, 40 are disposed such that in use, i.e. with the head 16 in position to scoop or catch waste material, the top pin 38 and bottom pin 40 are substantially located in a same vertical plane.

In an alternate embodiment, the retaining elements are provided directly on the head 16.

The first section 30 further includes, near the end 50 opposite of the arms 36, at least one clip member 42. In the embodiment shown, two substantially diametrically opposed clip members 42 extend from the first section 30. The clip members 42 are disposed such as to extend from each side of the shaft 18 when the device 10 is in use. Alternately, more than two clip members can be provided.

As best seen in FIG. 1, each clip member 42 includes a curved connecting portion 44 extending from the first section 30, a main portion 46 extending from the connecting portion 44 substantially parallel to and spaced apart from the first section 30, and a curved free end portion 48 extending from the main portion 46 toward the first section 30 to end in contact with or in proximity thereof. The free end portion 48 is further from the pivot connection 20 than the connecting portion 44, i.e. the free end portion 48 is upward of the connecting portion 44 when the frame 12 is held vertically with the head 16 down. The clip members 42 can be formed integrally with the first section 30, for example by molding, or can alternately be formed separately and attached thereto. Alternate configurations for the clip members 42 are also possible.

The second shaft section 32 is a hollow rod which is slidably received within the first section 30. The end 50 of the first section 30 receiving the second section 32 is tapered, such as to snuggly surround the second section 32 and frictionally retain it in place at least in the extended position. At the end opposed from the first section 30, the second section 32 includes a sleeve 52, which acts as a stop member preventing the second section 32 from sliding too far into the first section 30.

The third shaft section 34 is also a rod which is slidably received within the hollow second shaft section 32. The sleeve 52 of the second section 32 has a tapered end 54 snuggly surrounding the third section 34 and frictionally retaining it in a desired position. Thus, by sliding the first, second and third shaft sections 30, 32, 34 with respect to one another, a desired shaft length can be selected. This also allows the shaft 18 to be reduced to a minimum length when not in use to minimize the space necessary for storing the device 10. The sections 30,32,34 may also each have several relative pre-set positions, for example by having a depressible pin extending from one of the sections 30,32,34 engageable into one of several receiving holes defined in an adjacent section 30,32,34.

The third shaft section 34 also includes, at a free end thereof, a handle portion 56 for facilitating handling of the frame 12 by a user. The handle portion 56 also acts as a stop member preventing the third shaft section 34 to slide too far into the second shaft section 32. Optionally, the handle portion 56 can include a storage compartment defined therein, for example for storing treats or additional bags 14. Similar storage compartments can also be provided in or extend from one of the sections 30,32,34, for example in the first section 30, defined such as not to interfere with the relative sliding motion of the sections 30,32,34.

Additional optional equipment can also be provided on the shaft 18, for example a light source such as a small lamp (not shown) providing lighting generally oriented toward the head 16 of the frame 12 to facilitate use of the device 10 in the dark.

The first, second and third shaft sections 30, 32, 34 can be made of any combination of suitable materials, such as, for example, various plastics or metals.

Figure 4:
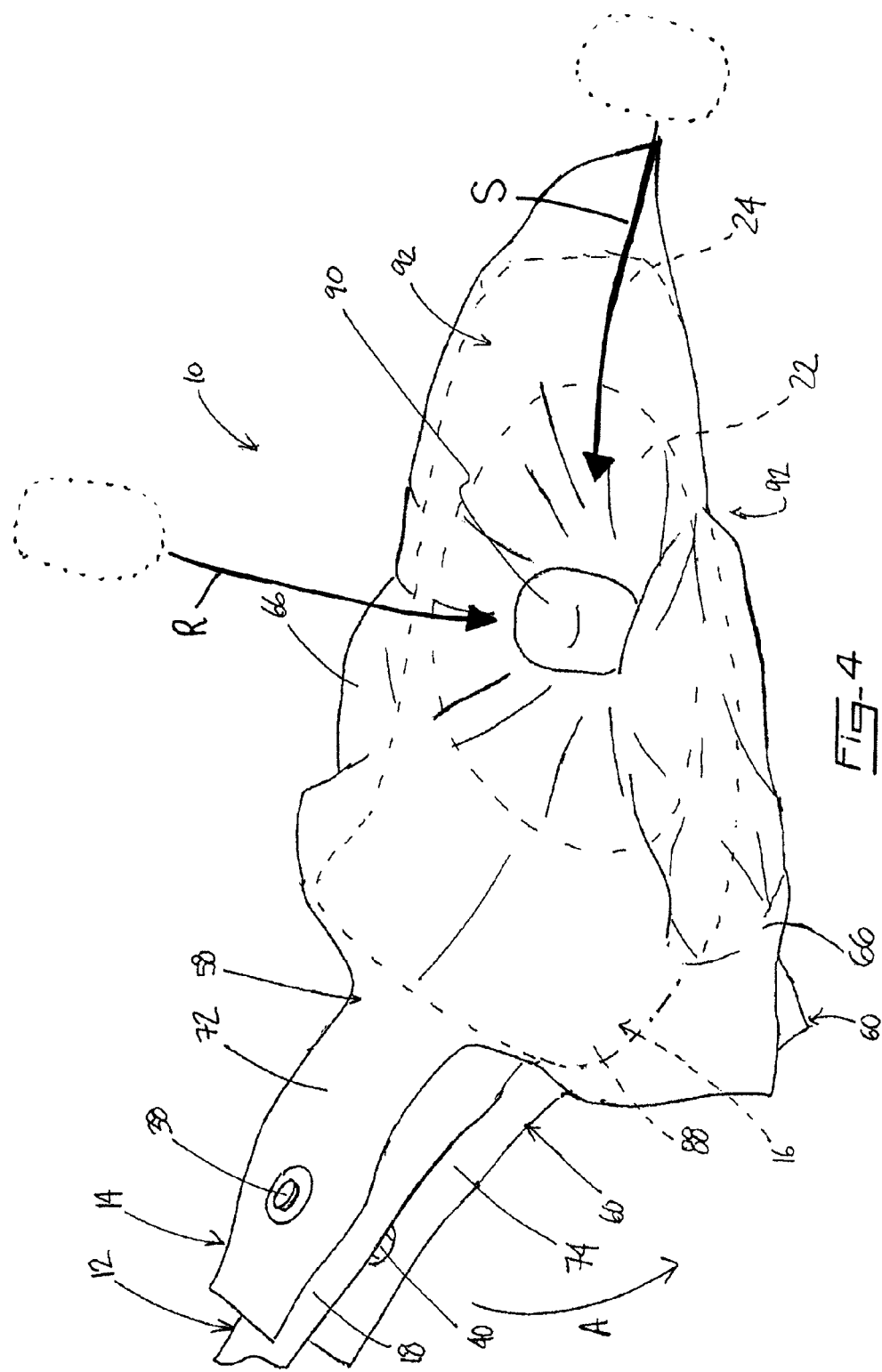
FIG. 4 is a perspective, partial view of the frame of FIG. 1 used with the bag of FIG. 3, with a piece of waste material being received thereon.

Referring to FIGS. 3 and 4, the bag 14 includes top and bottom panels 58, 60 each having an approximate truncated triangular shape, the top and bottom panels 58, 60 being interconnected along a front edge 62, defining the truncated edge of the truncated triangular shape, and along two angled side edges 64 extending from the front edge 62 away from each other. The angle of the side edges 64 allows the interconnected panels 58, 60 to define enlarged side portions 66 in the bag 14. The panels 58, 60 further define an open end 68 at the rear of the bag 14. The bag 14 has a central axis 70, which is defined at mid-distance between the interconnected side edges 64. A sealed length of the bag is defined by the projection of the interconnected side edges 64 onto the central axis 70, and shown at L.

A finger or tab 72, 74 extends rearwardly from each of the top and bottom panels 60, 62 respectively, the tabs 72, 74 being separate from one another. Each tab 72, 74 has a retaining element complementary to the corresponding retaining element of the first section 30, which in the particular embodiment shown includes a hole 84,86 defined therethrough substantially along the central axis 70.

Referring to FIG. 4, the head 16 of the frame 12 can be inserted through the open end 68 of the bag 14, with portions of the top and bottom panels 58, 60 extending respectively directly over and under the head 16 and the side portions 66 extending beyond the head 16 and hanging loosely on each side thereof. The interconnected side edges 64 extend up to a rear edge 88 of the head 16 extending in proximity of the pivot connection 20, such that the rearmost part of the head 16 is contained within the bag 14. In an alternate embodiment, the rearmost part of the head 16 can extend outside of the bag 14 such as to have a smaller bag 14, since a smaller sealed length generally requires a smaller excess width of the bag 14, thus smaller side portions 66, to allow for a relatively easy inversion of the bag 14, as will be discussed further below.

The retaining elements or holes 84, 86 in the tabs 72, 74 are disposed such as to each engage a respective one of the retaining elements or top and bottom pins 38, 40 extending from the first section 30, such as to secure the bag 14 to the frame 12. Thus, depending on the position of the pins 38, 40 relative to one another, the holes 84, 86 are not necessarily aligned when the bag 14 is in the folded configuration depicted in FIG. 3.

In an alternate embodiment, the pins 38, 40 received in the tab holes 84, 86 can be replace with equivalent retaining elements, such as, for example, clips extending from the first section 30 and pinching the tabs 72, 74 or another portion of a rear edge of the top and bottom panels.

In use, and with reference to FIG. 4, the head 16 inserted in the bag 14 is positioned such as to receive a waste element 90 to be disposed of, for example by retaining the frame 12 by the handle portion 56 and placing the head 16 under a crouching animal prior to defecation to catch the element 90 as shown in R. Alternately, the head 16 inserted in the bag 14 can be used to scoop a waste element already on the ground as shown in S. In both cases, the waste element 90 will rest on top of an outer surface 92 of the bag 14 over the opening 22 of the head 16, with the weight of the waste element 90 causing the bag 14 to slightly sag through the opening 22. As mentioned above, the opening 22 can be omitted if the head 16 has a concave or other adequate shape allowing the waste element 90 to be received therein.

As this point, the outer surface 92 of the top panel 58 is likely soiled by the waste element 90. The outer surface 92 of the bottom panel 60 can also possibly be soiled through contact with the ground. Moreover, in cases where the device 10 is used to scoop waste already on the ground, the outer surface 92 of the top and/or the bottom panel 58, 60 can be soiled around the leading edge 24 of the head 16. However, the tabs 72, 74 of the top and bottom panels 58, 60, which lie against the handle shaft 18, are not likely to have been soiled during catching or scooping of the waste element 90. In addition, since the head 16 of the frame 12 is substantially received within the bag 14, the head 16 is advantageously protected from being soiled by the waste element 90 or the ground.

Figure 5:
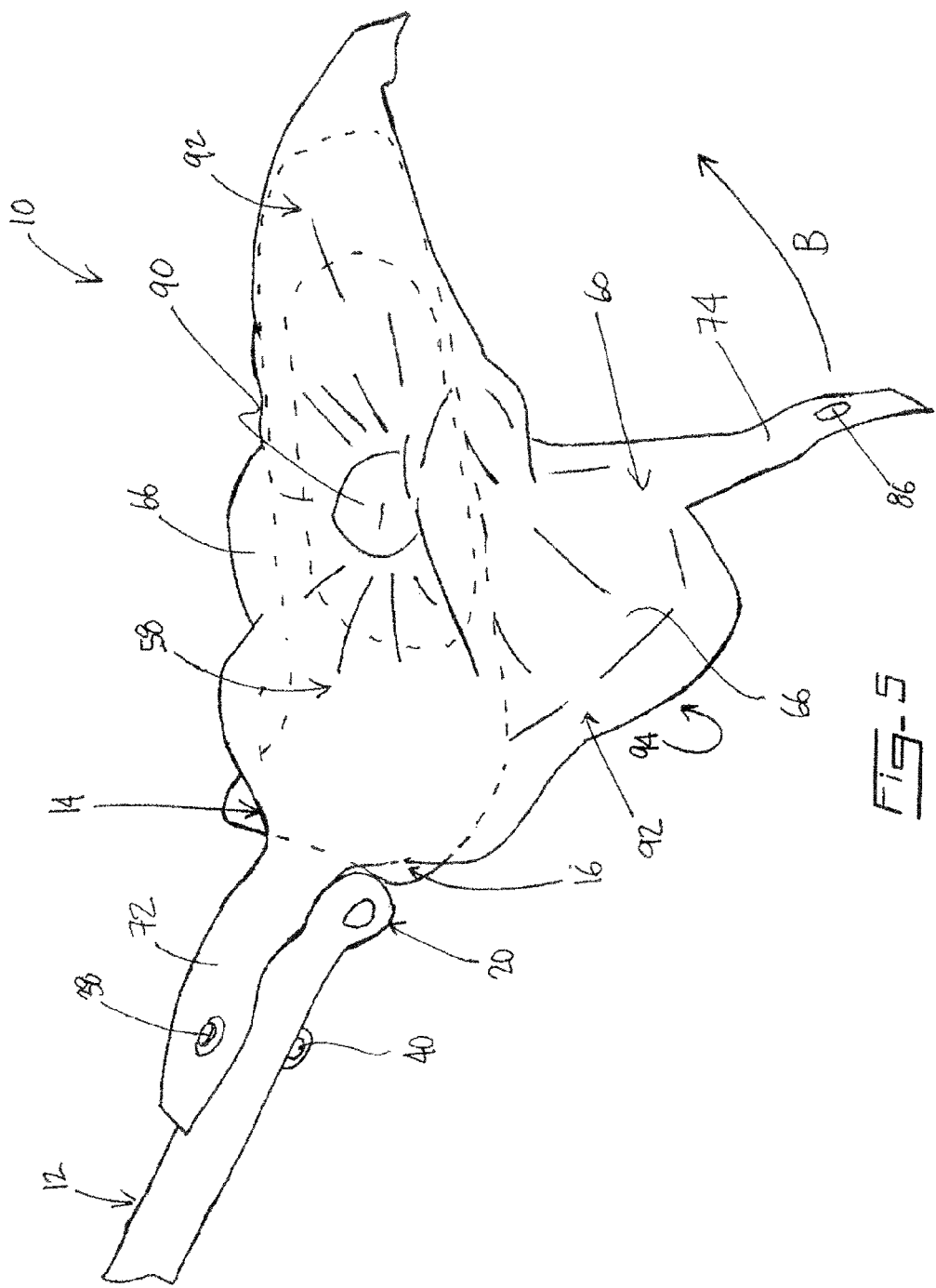
FIG. 5 is a perspective, partial view of the frame and bag of FIG. 4, with the bag being partially inverted.

Referring to FIG. 5, the waste element 90 is disposed of by inverting the bag 14 such that the outer, soiled surface 92 thereof becomes the new inner surface of the bag 14, and an inner, clean surface 94 of the bag 14 becomes the new outer surface. With the top pin 38 remaining engaged within the hole 84 of the top tab 72 (or the rear edge of the top panel otherwise engaged to the frame), the bottom pin 40 is disengaged from the hole 86 in the bottom tab 74. The bottom tab 74 (or the rear edge of the bottom panel) is pulled frontwardly under the head 16, as indicated by arrow A in FIG. 4 and arrow B in FIG. 5. The enlarged side portions 66 of the bag 14 provide the loose material necessary for this inverting motion to occur. As the top tab 72 remains attached to the top pin 38, the top panel 58 remains in place while the bottom panel 60 is progressively being inverted.

Figure 6:
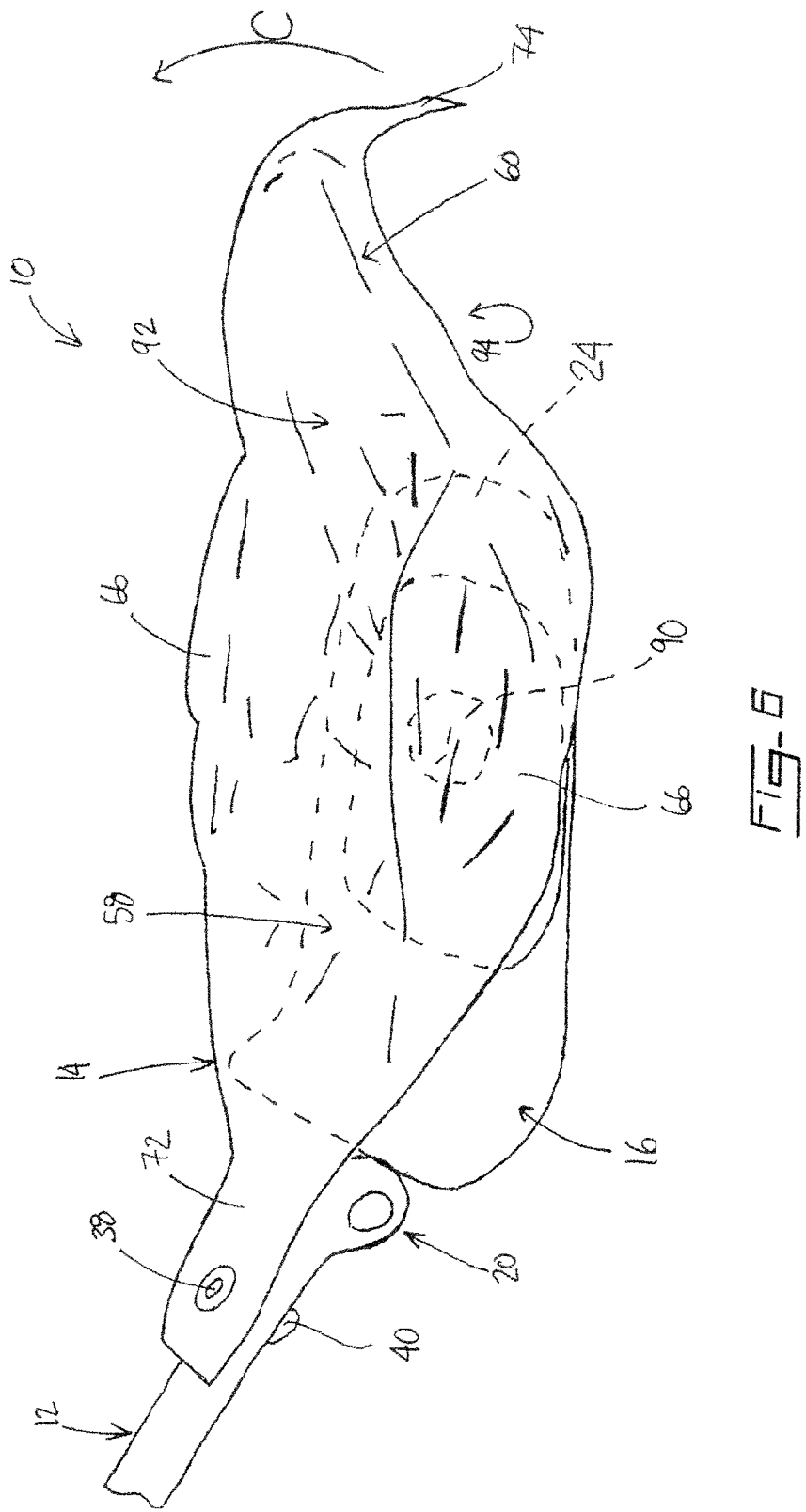
FIG. 6 is a perspective, partial view of the frame and bag of FIG. 4, with the bag being further inverted.

Referring to FIG. 6, the bottom tab 74 is pulled in front of the leading edge 24 of the head 16, then upwardly and over the top panel 58, as shown by arrow C. The former outer surface 92 of the bag 14 is now the inner surface of the bag 14, with the waste element 90 being contained therein. The bag 14, now inverted, can be detached from the frame 12 and tied closed by tying the tabs 72, 74 together, without the hands of the user being in contact with the soiled surface 92 of the bag, which is now on the inside thereof.

Figure 7:
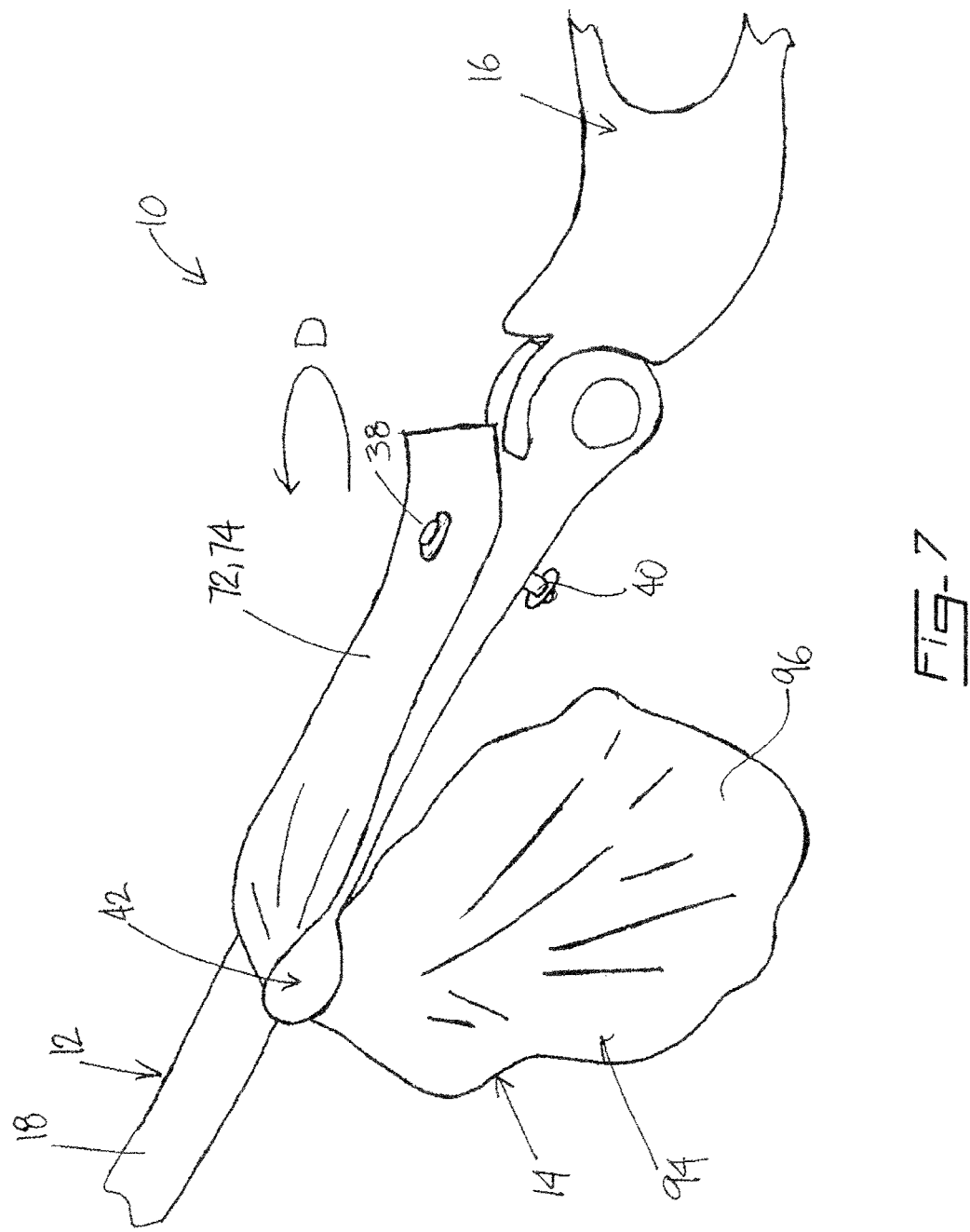
FIG. 7 is a perspective, partial view of the frame and bag of FIG. 4, with the bag being completely inverted and supported in a closed configuration on the frame.

Referring to FIG. 7, instead of detaching the bag 14 from the frame 12, the bag 14 can alternately be retained in a closed configuration on the frame 12. The bottom tab 74 is re-attached to the frame 12 over the top tab 72 by inserting the top pin 38 within the hole 86 of the bottom tab 74. Then, the bag 14 is rotated about approximately 180°, as indicated by arrow D, and passed within one of the clip members 42 such that a bottom portion 96 of the bag 14 freely hangs over the clip member 42. The weight of the waste element 90 contained within the bag 14 will maintain the bottom portion 96 within the clip member 42. The distance between the top pin 38 and the clip members 42 is smaller than the distance between the open end 68 of the bag 14 and the holes 84, 86 in the tabs 72, 74, such that the interconnected side edges 64 extend throughout the bottom hanging portion 96 of the bag 14, i.e. no opening is defined between the top and bottom panels 58, 60 within the bottom portion 96 such as to prevent potential leaks. The clip member 42 thus temporarily closes the bag 14 until the user can remove the bag 14 from the frame 12 to dispose of it, optionally tying it closed upon removal from the frame 12, for example by tying the tabs 72, 74 together. This allows a user to easily close the bag 14 while requiring minimal manipulation thereof.

In a particular embodiment, multiple bags 14 are disposed around the head 16 one over the other, such that after one bag 14 is used, inverted and removed or rotated and held by the top pin 38 and clip member 42, the device 10 is already ready for a subsequent use.

The waste retrieval and disposal device 10 can thus be used to directly catch waste material such as feces from dogs or other animals before the waste material falls on the ground. Alternately, the leading edge 24 of the head 16, which is substantially sharp similarly to the leading edge of a shovel, facilitate the use of the device 10 to scoop waste material already on the ground. In both cases, the waste material received on the device 10 can then be disposed of without soiling what will become the outer surface of the closed bag.

In an alternate embodiment, the frame 12 can be deposited directly on the ground where the waste material is likely to fall, and as such the handle shaft 18 can optionally be replaced by a member connected to the head 16, such as for example the first section 30, supporting at least the top pin 38 or other equivalent retaining means to retain the top panel 58 of the bag 14 during the inversion thereof. Such an embodiment can be used, for example, at the bottom of a birdcage, as a temporary or permanent replacement for a cat's litter, instead of a usual sheet of newspaper where some dogs are trained to do their business, etc. Such an embodiment can also be used as a toilet for humans where bathrooms are not easily accessible, such as in camping, in the woods, etc. Optionally, the head 16 can be supported at a given height from the ground by any adequate means to facilitate use. In all of these embodiments, the waste material is received on the top panel, and the bag is inverted as described above to dispose of the waste material.

The embodiments of the invention described above are intended to be exemplary. Those skilled in the art will therefore appreciate that the foregoing description is illustrative only, and that various alternate configurations and modifications can be devised without departing from the spirit of the present invention. Accordingly, the present invention is intended to embrace all such alternate configurations, modifications and variances which fall within the scope of the appended claims.

We claim:

1. A method for disposing of waste material comprising:
   partially inserting a frame within a bag through a rear open end thereof, the bag having partially interconnected top and bottom panels respectively extending over and under the frame and defining the rear open end;
   retaining a rear edge of the top panel to the frame;
   receiving waste material on the top panel over the frame;
   with the rear edge of the top panel retained to the frame, moving a rear edge of the bottom panel frontwardly of a front edge of the frame to at least partially invert the bottom panel; and
   with the rear edge of the top panel retained to the frame, moving the rear edge of the bottom panel rearwardly over the top panel and the waste material to invert the bag while containing the waste material therewithin.

2. The method according to claim 1, wherein receiving the waste material includes placing the top panel on an expected falling location of the waste material and catching the falling waste material on the top panel.

3. The method according to claim 1, wherein receiving the waste material includes scooping the waste material off a ground surface.

4. The method according to claim 1, further comprising after inverting the bag, attaching the rear edge of the bottom panel of the bag on the frame, and rotating the bag about the rear edges of the top and bottom panel to engage the bag with a clip member provided on the frame.

5. A method for disposing of waste material comprising:
   providing a frame having a head and a handle extending from a rear edge thereof;
   inserting the head in a bag until a closed front edge of the bag receives a leading edge of the head and the head is at least substantially contained within the bag, the head fitting loosely within the bag along side edges thereof;
   positioning an opening of the bag adjacent the rear edge of the head, with rear edges of top and bottom panels of the bag being defined along the opening;
   connecting the rear edge of the top panel to the frame;
   receiving the waste material on a portion of the top panel extending over the head with the bottom panel extending under the head; and
   while maintaining the connection between the rear edge of the top panel and the frame, inverting the bag by moving the rear edge of the bottom panel frontwardly of the head and of the front edge of the bag before moving the rear edge of the bottom panel rearwardly over the top panel, the head and the waste material.

6. The method according to claim 5, further comprising, before receiving the waste material on the top panel, connecting the rear edge of the bottom panel to the frame, and before inverting the bag, disconnecting the rear edge of the bottom panel from the frame.

7. The method according to claim 5, wherein connecting the rear edge of the top panel to the frame includes connecting the rear edge of the top panel to the handle.

8. The method according to claim 5, wherein receiving the waste material includes catching the waste material on the top panel as the waste material is falling.

9. The method according to claim 5, wherein receiving the waste material includes scooping the waste material off a ground surface with the bottom panel in contact with the ground surface.

10. The method according to claim 5, further comprising after inverting the bag, closing the bag by attaching the rear edge of the bottom panel with the rear edge of the top panel and rotating the bag about the attachment to engage the bag with a clip member provided on the frame.

11. The method according to claim 5, wherein receiving the waste material on the portion of the top panel extending over the head includes receiving the waste material on a portion of the top panel extending across an opening defined through the head.

12. The method according to claim 5, wherein inserting the head in the bag is performed such that the front edge of the bag receives the leading edge of the head and the head is completely contained within the bag.

13. The method according to claim 5, wherein inserting the head in the bag is performed such that the front edge of the bag receives the leading edge of the head and a rearmost part of the head extends out of the bag.

14. The method according to claim 5, wherein the waste material is pet waste.

15. The method according to claim 5, wherein connecting the rear edge of the top panel to the frame includes connecting a tab extending rearwardly from the top panel to the frame.

* * * * *